United States Patent Office 3,429,930
Patented Feb. 25, 1969

1

3,429,930
PROCESS FOR THE OXIDATION
OF OLEFINES
Emile Heslan, Pau, France, assignor to Societe Nationale des Petroles d'Aquitaine, Paris, France
No Drawing. Filed Sept. 13, 1965, Ser. No. 487,050
Claims priority, application France, Sept. 14, 1964,
988,011
U.S. Cl. 260—604       6 Claims
Int. Cl. C07c 45/02; B01j 11/06

ABSTRACT OF THE DISCLOSURE

The present invention is directed to a process for the oxidation of olefines into unsaturated aldehydes which comprises contacting a gaseous mixture of an olefine, oxygen and nitrogen at a temperature of from 300° to about 500° C. with a catalyst comprising $P_2O_5$, from 10 to 40 moles of $MoO_3$ per mole of $P_2O_5$ and from 2 to about 50 moles of $TeO_3$ per $P_2O_5$, wherein the molar ratio of $MoO_3$ to $TeO_3$ is from about 0.8 to about 6.

---

The invention concerns the oxidation of hydrocarbons and in particular unsaturated hydrocarbons by means of oxygen, and a new catalyst. Although the invention is applied to the oxidation of different compounds such as olefins, diolefins, acetylenic hydrocarbons, aromatic or alkylated aromatic hydrocarbons, alcohols, aldehydes, terpenes, etc., it is particularly effective for the production of unsaturated aldehydes starting from olefins. One very important practical application of this invention is the manufacture of acrolein starting from propylene or of methacrolein starting from isobutylene.

Different catalysts have been proposed for carrying out such reactions, but it has not been possible, up to the present, of attaining really interesting yields of aldehydes with respect to the olefin consumed. In the most favorable cases the yield hardly exceeds 85%. Thus in a known process, using the oxide of hexavalent tellurium together with the oxides of metals such as Mo, W, etc. the best conditions, that is to say the atomic ratio Te/Mo=1/6, lead to yields in acrolein with respect to propylene consumed of 50 to 85% with the rates of conversion of 76 to 37%; the rates of conversion vary inversely as the yields.

The present invention permits, on the other hand, yields to be obtained which are high in aldehyde, namely 95% or even more with respect to the weight of olefine transformed, and the rates of conversion of the propylene can exceed 55%, while the reaction temperature may be lower than in the similar catalytic process.

Thus the new process may be carried out between 300° and 500° C., the preferred range being from 380° to 440° C. while with the known catalysts of molybdenum and tellurium it is necessary to work above 450° C.

The process according to the invention consists in using, for the oxidation of hydrocarbons, or if desired of other organic compounds, a catalytic system in which the oxide of hexavalent tellurium, associated with one or more oxides of metals such as Mo, W and V, contains a sufficient proportion of phosphorus pentoxide.

Thus, the new catalyst in accordance with the invention is characterized by the presence of at least one molecule of $P_2O_5$ for 40 molecules of oxides of Mo, W and/or V, and preferably 1 mole $P_2O_5$ for 10 to 24 moles of the said oxides.

2

The amount of $TeO_3$, of the improved catalytic system in accordance with the invention, may vary between fairly wide limits, for example from 1 mole $TeO_3$ for 8 $MO_3$ where M represents the associated metal, up to 1 mole telluric oxide for 0.5 mole $MO_3$. The preferred molecular ratio $MO_3/TeO_3$ is from 0.8 to 6 or better from 1 to 3.

In other words the preferred method of carrying out the invention utilises catalytic systems composed of $P_2O_5+mMoO_3+nTeO_3$ in which $m$ has a value of 10 to 24 and $n$ has a value of 2 to 50 and preferably of 8 to 25, $n$ and $m$ being the numbers of moles.

Although it is not possible to state exactly whether the oxides of the catalyst, ignited once, constitute a chemical combination or a physical mixture, some of the especially advantageous compositions are described below as if it is a true combination of oxides. In particular, excellent results are obtained with catalysts of the composition:

$P_2O_5 \cdot 24MoO_3 \cdot 4TeO_3$ to $P_2O_5 \cdot 24MoO_3 \cdot 24TeO_3$ and preferably $P_2O_5 \cdot 24MoO_3 \cdot 4 \cdot 8TeO_3$ to $P_2O_5 \cdot 24MoO_3 \cdot 22TeO_3$; it being understood that these oxides are fixed on a support of known type, such as alumina, silica, silicoaluminates or others. The proportion of dry matter of this support, in the final catalyst, is preferably from 10 to 70% by weight; excellent results are obtained with amounts from 30 to 60%.

The Mo may be partially or wholly substituted by V and/or by W.

The invention equally comprises a new process for the preparation of oxidation catalysts based on telluric oxide. This process consists in forming first an aqueous solution of all or of a part of the elements to be used, in particular Te, Mo and P taken in the form of their compounds which are soluble in water; mixing the solution with a silica sol or eventually with a sol of another material acting as a support and finally allowing the mixture to gel. The gel obtained put into suitable physical form, such as granules, pastilles or others, dried, and then calcined, before being used for the intended purpose. The calcination may take place at temperatures of 350° to 700° C., but it is preferable to effect it at a temperature a little in excess, for example by 20 to 80° C., that at which the catalyst should operate during the oxidation of the propylene; the preferred calcination temperatures are then in the region of 400° to 500° C., and the best from 420° to 480° C.

In a variant of the new process for the preparation of the catalyst, the aqueous solution of the compounds of Te, Mo and P is rendered acid, preferably by the addition of an acid such as $HNO_3$ which is completely eliminated in the course of the calcination. This acidification enables the constituents to be kept in solution more reliably, without risk of precipitation of one of them. In addition it accelerates the subsequent formation of the gel, after mixture with the sol. If desired the constituents may be dissolved directly in the hydrosol of silica.

The soluble constituents, which can be used for the preparation of the starting solution of the catalyst in accordance with the invention, are for example, tellurates, molybdates, phosphates, telluro-molybdates, phosphomolybdates, telluro-phosphates, vanadates, tungstates, vanado-molybdates and phospho-vanado-molybdates of alkali metals or of ammonium, or the corresponding acids.

Thus, in accordance with the preferred form of the invention and instead of taking compounds of Te, Mo, P etc. in the solid state, as is the usual practice in the preparation of catalysts in the known art, they are used in solution. In other words, everything is liquid, entirely dissolved in the water, from the time of the first operational stage in accordance with the invention. It is only to homogenize the product formed by the solidification of this liquid phase that drying is applied and the product is then calcined.

The catalyst, obtained in this way, calcined once, has a structure which is different from that of known tellurium catalysts. It has, in fact, a very high homogeneity, due to the extremely regular distribution of the active elements on the supporting body. This structure and homogeneity allow the oxidation (to take place) with excellent yields and good selectivities, at temperatures which are sufficiently low for the catalyst to remain stable. The new catalyst enjoys improved mechanical qualities and is very suitable for the fluidised bed technique.

In the application of the catalyst in accordance with the inventiton to the oxidation of propylene into acrolein, the duration of the contact of the hydrocarbon mixture and oxygen with the catalytic mass may be varied at will, but it is preferable that it should be of the order of 0.5 to 15 seconds, or better from 1 to 5 seconds for temperatures from 380° to 440° C.

In the production of acrolein, the mixture of propylene and air may contain a proportion of air such that the oxygen is in excess of the hydrocarbon.

In particular, excesses of oxygen from 10 to 100% may be used. Nevertheless, for excesses up to about 50%, it is advisable to adjust the amount of water vapor of the gaseous mixture in order to avoid a possible explosive operation. This operation may of course be avoided by other known means, and in particular by employing an apparatus utilising the catalyst in the form of a fluidised bed, in which case an explosion is not to be probable. Preferably, the excess of oxygen with respect to that which is theoretically necessary, is from 20% to 40%.

On the other hand it is possible to work with a stoichiometric mixture as far as propylene and oxygen are concerned, or else with an excess of propylene. In the latter case, it is best, for economic reasons, not to exceed a 20% excess of hydrocarbon.

The invention is non-limitatively illustrated by the following examples.

EXAMPLE 1

(Catalyst prepared by a known process; French patent No. 1,345,016.) 22.4 g. of fine, dry, crystalline powder of ammonium telluromolybdate $(NH_4)_6TeMo_6O_{24}.7H_2O$ is mixed with 72 g. of a silica sol having 6% $SiO_2$. The thus formed magma is dried at 110° C., then calcined at 420° for 24 hours. The product obtained has a composition by weight of 80% $TeO_3.6MoO_3$ and 20% $SiO_2$. After screening, grains of this product of about 1 mm. size are used as the catalyst. The catalyst is then tested in a tube of stainless steel 12 mm. in diameter, into which 10 ml. of the catalyst mass is introduced.

The reactor tube is kept at 415° C. in a bath of salt, while a stream of gas composed of a mixture of 71 volumes of air (i.e. 17.7 oxygen), 15 volumes of propylene and 14 volumes of water vapor are caused to pass into the lower end thereof. The delivery of gas is 11.2 l./hr., expressed in liters at 0 under 760 mm./Hg, which corresponds to a contact time of 1.25 sec. between the gas and the catalyst, calculated with respect to the full tube, the gaseous volume being brought back to the normal conditions.

The rate of conversion of the propylene is 30% and the selectivity in acrolein 76%.

EXAMPLE 2

The same catalyst as in Example 1 is tested under the same conditions except that the temperature of the reaction tube is kept at 460° C.

The conversion of the propylene is then 37% and the acrolein selectivity is 80%.

EXAMPLE 3

(Catalyst prepared in accordance with the invention.) 22.4 g. of ammonium telluromolybdate.

$(NH_4)_6TeMo_6O_{24}.7H_2O$ is mixed with 560 g. of a silica sol having 6% $SiO_2$. The mixture is acidified with $HNO_3$, agitated vigorously several times until the telluromolybdate has dissolved completely, then laid out on a sheet of glass; when its consistency has become pasty, it is run across (extruded) a stainless steel plate which is perforated by holes of 1 mm. diameter. The product obtained is oven dried at 110° C. for 24 hours, then calcined at 450° C. for a further period of 24 hours. The thus formed catalyst comprises 34.4% by weight $TeO_3.6MoO_3$ and 65.6% $SiO_2$; it is tested at 415° C. in the manner described in Example 1.

The rate of conversion of the propylene is 36.4% and the acrolein is formed with a yield of 82.5% (selectivity) with respect to the propylene consumed. The activity of the catalyst is therefore better than that of the catalyst of known type of Examples 1 and 2, since it enables results to be obtained at 415° C. in the range of those which necessitate a temperature of 460° C. with the known catalyst.

EXAMPLE 4

To the initial mixture of Example 3 there is added 1.1 g. of 75% phosphoric acid, for instance 0.824 g. $H_3PO_4$, the other operations being the same.

The catalyst obtained contains 35% of

$P_2O_5.24MoO_3.4TeO_3$ and 65% of $SiO_2$.

At 415° C. it gives a conversion of the propylene of 38% and an acrolein selectivity of 84%, which constitutes an improvement with respect to Example 3.

EXAMPLE 5

The catalyst of Example 4, tested at 460° C., gives a conversion of 40% and a selectivity of 87%.

EXAMPLE 6

The preparation of the catalyst is effected in the manner disclosed in French Patent No. 1,345,016, as in Example 1 and 2, but with the addition of 1.1 of 75% phosphoric acid.

A catalyst is thus obtained containing 83.6% of

$P_2O_5.24MoO_3.4TeO_3$ and 16.4% $SiO_2$. Tested at 415° C. it gives a propylene conversion of 37% and an acrolein selectivity of 82%. The comparison with Example 1 shows an improvement attributable to the addition of $P_2O_5$.

EXAMPLE 7

A catalyst is prepared according to the new process described above in Example 3, but starting with 30.3 g. of phosphomolybdic acid $24MoO_3.2H_3PO_4.48H_2O$ and 215 g. of a silica sol having 6% $SiO_2$.

After drying and calcination the mass is impregnated with a telluric acid solution in such quantity that the atomic ratio Mo/Te is equal to 5; the impregnated product is dried at 110° C. for 5 hours, then calcined at 450° C. for 12 hours. A catalytic mass is finally obtained containing 70% by weight of $P_2O_524MoO_3.4.8TeO_3$ and 30% by weight of $SiO_2$. The catalytic activity of this system is determined in the same manner as in Example 1, at 388° C. The rate of conversion obtained is 34% and the yield in acrolein with respect to propylene consumed 88% (selectivity).

EXAMPLE 8

The catalyst of Example 7 is utilised for the oxidation of propylene at 414° C. The conversion is 50% and the acrolein selectivity 88%.

EXAMPLE 9

In the preparation of the catalyst of Example 7 the same proportions of reactants are used, but the phosphomolybdic and telluric acids are at once dissolved together in hot water, without addition of nitric acid; the thus obtained solution is mixed with the silica sol and the whole is left to turn into gel. The continuation of the operations is that of Example 3.

At 414° C. this catalyst gives a conversion of 48.5% and a selectivity of 90%.

EXAMPLE 10

0.66 g. of 75% phosphoric acid, that is 0.495 g. $H_3PO_4$ and 0.77 g. telluric acid are added to the initial mixture of Example 3; the continuation of the operations is the same as that of Example 3, which produces a catalyst of which the active part consists of $$0.6P_2O_5.24MoO_3.4.8TeO_3$$

This catalyst, at 414° C., is conducive to the conversion of 42% of propylene with a selectivity of 82.8%; it is therefore less active than that of Examples 8 and 9, from which it differs by its content of 0.6 instead of 1 mole $P_2O_5$.

EXAMPLE 11

In the preparation according to Example 7 the phosphoric acid has been added in addition in such a way as to have a catalyst of which the active part is constituted by:

$$2P_2O_5.24MoO_3.4.8TeO_3$$

This catalyst gives, at 414° C.: conversion of the propylene 50%, acrolein selectivity 92%.

EXAMPLE 12

Using the method of operation of Example 3, a catalyst was prepared starting with a mixture of 21 g. phosphomolybdic acid, 9 g. telluric acid and 25 g. silica hydrosol having 6% silica.

After drying and calcination there is a catalytic mass containing about 56% by weight of $$P_2O_5.24MoO_3.8.2TeO_3$$

and 44% of $SiO_2$. The propylene oxidation tests have resulted in 51.4% conversion for an acrolein selectivity of 93%.

EXAMPLE 13

In a preparation in accordance with Example 12, an addition of phosphoric acid is made for bringing the composition of the catalyst to:

$$2P_2O_5.24MoO_3.8.2TeO_3$$

A propylene conversion of 52% is then obtained and an acrolein selectivity of 93.7%.

EXAMPLE 14

Applying the operational method of Example 3, a catalyst was prepared starting with a mixture of 21 g. phosphomolybdic acid, 14 g. telluric acid and 250 g. silica sol having 6% $SiO_2$. After drying and calcination, the catalytic mass contained 65% by weight $$P_2O_5.24MoO_3.12.7TeO_3$$

and 35% $SiO_2$. The preparation of acrolein at 404° C., in the conditions of Example 1, gave a rate of conversion of the propylene of 53.3% and a yield of acrolein of 95% (selectivity) with respect to the propylene having reacted.

EXAMPLE 15

$H_3PO_4$ was added to the initial solution of Example 14 in such a way as to double the molar proportion of $P_2O_5$ in the catalyst.

The conversion was then 54% and the selectivity 95.6%.

EXAMPLE 16

In accordance with the technique utilised in Example 9, a catalyst was prepared starting with a mixture of 17.5 g. of ammonium phospho-vanado-molybdate in which the Mo/V ratio was 0.875, with 17.5 g. telluric acid and 250 g. silica sol having 6% $SiO_2$. The empirical formula of the active part of the catalyst was:

$$1.14P_2O_5.24MoO_3.22TeO_3.1.72V_2O_5$$

At 400° C. in the conditions of delivery and of composition of the gas indicated in Example 1, the rate of conversion was 55%, whilst the acrolein was formed with a selectivity of 91% with respect to the propylene consumed.

The results of the preceding examples are combined in the following table, in which the vertical columns indicate:

(I) ordinal number of the example;
(II) number of moles $P_2O_5$ for $24MoO_3$ in the catalyst;
(III) number of moles $TeO_3$ for $24MoO_3$ in the catalyst;
(IV) temperature of the oxidation of the propylene;
(V) percent rate of conversion of the propylene;
(VI) percent selectivity to acrolein;
(VII) method of preparation of the catalyst used:

S—known method, by mixing solid reactants with a sole, and subsequent drying, followed by the calcination;

T—method of the invention: previous preparation of an aqueous solution containing the reactants and the silica sol, transformation of this solution into gel, then drying and calcination.

A—method being a variant of T, consisting in operaing in acid media.

TABLE
[$MoO_3$=24 moles]

| I | II | III | IV | V | VI | VII |
|---|---|---|---|---|---|---|
| Ex. No. | $P_2O_5$ | $TeO_3$ | ° C. | Conv., Percent | Select, Percent | Method |
| 1 | 0 | 4 | 415 | 30 | 76 | S |
| 2 | 0 | 4 | 460 | 37 | 85 | S |
| 3 | 0 | 4 | 415 | 36.4 | 82.5 | A |
| 4 | 1 | 4 | 415 | 38 | 84 | A |
| 5 | 1 | 4 | 460 | 40 | 87 | A |
| 6 | 1 | 4 | 415 | 37 | 82 | S |
| 7 | 1 | 4.8 | 388 | 34 | 88 | A |
| 8 | 1 | 4.8 | 414 | 50 | 88 | A |
| 9 | 1 | 4.8 | 414 | 48.5 | 90 | T |
| 10 | 0.6 | 4.8 | 414 | 42 | 82.8 | A |
| 11 | 2 | 4.8 | 414 | 50 | 92 | A |
| 12 | 1 | 8.2 | 414 | 51.4 | 93 | A |
| 13 | 2 | 8.2 | 414 | 52 | 93.7 | A |
| 14 | 1 | 12.7 | 404 | 53.3 | 95 | A |
| 15 | 2 | 12.7 | 404 | 54 | 95.6 | A |
| 16 | 1.14 | 22 +1.72 $V_2O_5$ | 400 | 55 | 91 | A |

What we claim is:

1. A process for the oxidation of an olefin into an unsaturated aldehyde which comprises bringing a gaseous mixture of olefin, oxygen and nitrogen, at a temperature of 300 to 500° C. in contact with a catalyst comprising the oxides of Mo, Te and P, characterized in that said catalyst contains for 1 mole of $P_2O_5$, 2 to 50 moles $TeO_3$ and 10 to 40 moles $MoO_3$, the number of moles $MoO_3$ being 0.8 to 6 per mole $TeO_3$, said catalyst having been fixed on a support by dissolving said oxides in a hydrosol of silica, transforming the thus obtained liquid mixture into a gel and then calcining the gel.

2. A process according to claim 1, characterized in that the oxides of Mo, Te and P are first dissolved in water to form a solution and then the solution is mixed with the hydrosol of silica.

3. A process according to claim 2 characterized in that the aqueous solution of the compounds of Te, Mo and P is rendered acid before being added to the hydrosol of silica.

4. A process according to claim 3, characterized in that the acid is $HNO_3$.

5. A process according to claim 4 wherein the olefin is propylene and the propylene is oxidized to acrolein.

6. A process according to claim 1 wherein the olefin is propylene and the propylene is converted to acrolein.

References Cited

UNITED STATES PATENTS

| | | | |
|---|---|---|---|
| 3,230,248 | 1/1966 | Yanagita et al. | 260—604 XR |
| 3,031,508 | 4/1962 | Etherington et al. | 260—604 |
| 2,753,377 | 7/1956 | Richter | 260—604 XR |
| 2,653,138 | 9/1953 | Middleton | 260—604 XR |
| 3,192,259 | 6/1965 | Fetterly et al. | 260—604 |

FOREIGN PATENTS 1,345,016   10/1963   France.

LEON ZITVER, *Primary Examiner.*

R. H. LILES, *Assistant Examiner.*

U.S. Cl. X.R.

252—437